United States Patent
Subramanian et al.

(10) Patent No.: US 9,291,472 B2
(45) Date of Patent: Mar. 22, 2016

(54) AUDIBLE CONSUMPTION OF CONTENT WHILE TRAVELING TO A DESTINATION

(71) Applicants: Venkitesh Subramanian, Palo Alto, CA (US); Venkat Iyer, Palo Alto, CA (US); Prerna Makanawala, Mountain View, CA (US); Lin Pang, Palo Alto, CA (US); Ryan Currier, Palo Alto, CA (US)

(72) Inventors: Venkitesh Subramanian, Palo Alto, CA (US); Venkat Iyer, Palo Alto, CA (US); Prerna Makanawala, Mountain View, CA (US); Lin Pang, Palo Alto, CA (US); Ryan Currier, Palo Alto, CA (US)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/447,953

(22) Filed: Jul. 31, 2014

(65) Prior Publication Data
US 2015/0345980 A1    Dec. 3, 2015

Related U.S. Application Data (60) Provisional application No. 62/006,773, filed on Jun. 2, 2014.

(51) Int. Cl.
*G01C 21/36*  (2006.01)
*G06Q 10/10*  (2012.01)
*G06Q 10/00*  (2012.01)

(52) U.S. Cl.
CPC ........ *G01C 21/3626* (2013.01); *G01C 21/3629* (2013.01); *G01C 21/3667* (2013.01); *G06Q 10/10* (2013.01); *G06Q 10/20* (2013.01)

(58) Field of Classification Search
CPC ........... G01C 21/3626; G01C 21/3667; G01C 21/3629; G06Q 10/10; G06Q 10/20
See application file for complete search history.

(56) References Cited

U.S. PATENT DOCUMENTS

| | | | | |
|---|---|---|---|---|
| 2008/0306682 A1* | 12/2008 | Dorfstatter | ............. | G01C 21/34 701/408 |
| 2009/0006994 A1* | 1/2009 | Forstall | .................. | G01C 21/20 715/764 |
| 2009/0037097 A1* | 2/2009 | Cho | ...................... | H04N 21/235 701/408 |
| 2009/0054086 A1* | 2/2009 | Kim | ................... | G01C 21/3438 455/457 |
| 2009/0271101 A1* | 10/2009 | Relyea | ................. | G08G 1/0104 701/118 |
| 2009/0316671 A1* | 12/2009 | Rolf | ........................ | H04W 4/02 370/338 |
| 2010/0004854 A1* | 1/2010 | Shin | .................... | G01C 21/3415 701/533 |
| 2010/0292886 A1* | 11/2010 | Szczerba | ............... | G01C 21/365 701/31.4 |
| 2012/0029964 A1* | 2/2012 | Tengler | .............. | G06Q 10/1095 705/7.19 |
| 2012/0143492 A1* | 6/2012 | Johnson | ............. | G01C 21/3461 701/411 |
| 2013/0290199 A1* | 10/2013 | Camacho | ................ | G01S 19/49 705/317 |

* cited by examiner

*Primary Examiner* — James Trammell
*Assistant Examiner* — James E Stroud (57) ABSTRACT

Techniques are described for providing additional content that is relevant to an upcoming service appointment in an audible format. The additional content can be retrieved from remote sources and aggregated to form an audio package to be played back to the technician as the technician travels to a destination address that corresponds with the upcoming service appointment. The additional content retrieved can depend on the estimated travel time to the destination address. By presenting the additional content audibly at the same time as route directions are being presented graphically, the driver can multi-task which results in time savings since the additional content has been consumed during the drive to the upcoming appointment rather than when the technician arrives at the destination address.

20 Claims, 9 Drawing Sheets

AUDIBLE CONSUMPTION OF CONTENT WHILE TRAVELING TO A DESTINATION

BACKGROUND

Companies are organizations that create goods which are sold to customers. Periodically, the goods sold can develop problems. To address these problems, companies have a customer support team that includes a help desk capable of answering questions over the phone and technicians that travel out to the customer to perform services at the customer site. These scheduled visits are called service appointments.

On a typical workday, a technician can have multiple service appointments lined up throughout the day. Each service appointment can differ from one another. For example, each service appointment can be for a different customer. Different customers can have different service plans and thus expect different levels of service from the technician. Furthermore, each service appointment can be to perform a different type of service on different types of goods. As a result, a different skillset may be needed for each service appointment. For these reasons, the technician needs to spend time reviewing the details of the service appointment beforehand. The review time required may be extended if the technician needs to review service manuals before reaching the service appointment in order to refresh his knowledge on a particular good. This is especially true if the company offers a wide range of goods. Depending on the service appointments, a technician may need anywhere from a few minutes to an hour to prepare for a given service appointment.

SUMMARY

In one embodiment, a computer-implemented method provides, by a processor, a map view that contains a set of route directions for traveling to a destination associated with an upcoming appointment. The method then detects, by the processor, an indication of a request for additional content on the upcoming appointment. After detecting the indication, the method retrieves, by the processor, textual content that is related to the upcoming appointment in response to the detection. The method then subsequently converges, by the processor, the textual content into audio content. The method then simultaneously presents by the processor, the audio content audibly and the set of route directions graphically.

In one example, the upcoming appointment is a service appointment to perform a task on a product located at the destination. The textual content can include instructions for performing the task on the product. In another example, retrieving the textual content can comprise determining, by the processor, an estimated travel time to reach the destination and retrieving, by the processor, the textual content based on the determination, wherein the textual content is a portion of the additional content that, when converted into the audio content, has a playback duration that is substantially equal to the estimated travel time to reach the destination. In yet another example, the method can include first determining, by the processor, an estimated travel time to reach the destination, second determining, by the processor, that the additional content available on the upcoming appointment, when converted into the audio content, has a playback duration that is less than the estimated travel time to reach the destination, identifying, by the processor, a subsequent upcoming appointment, retrieving, by the processor, extra content that is related to the subsequent upcoming appointment based on the second determination, and incorporating, by the processor, the extra content into the audio content. In another example, the method can include detecting, by the processor, a change in an estimated travel time to reach the destination and adjusting, by the processor, a playback speed of the audio content in accordance to the detection. In another example, the set of route instructions includes an audible representation and a graphical representation, wherein the audible representation of the set of route instructions is played over the audio content when a turn is approaching.

In another embodiment, a non-transitory computer readable storage medium stores one or more programs comprising instructions for providing a map view that contains a set of route directions for traveling to a destination associated with an upcoming appointment, detecting an indication of a request for additional content on the upcoming appointment, retrieving textual content that is related to the upcoming appointment in response to the detection, converting the textual content into audio content, and simultaneously presenting the audio content audibly and the set of route directions graphically.

In another embodiment, a computer implemented system comprises one or more computer processors and a non-transitory computer-readable storage medium. The non-transitory computer-readable storage medium comprises instructions, that when executed, control the one or more computer processors to be configured for providing a map view that contains a set of route directions for traveling to a destination associated with an upcoming appointment, detecting an indication of a request for additional content on the upcoming appointment, retrieving textual content that is related to the upcoming appointment in response to the detection, converting the textual content into audio content, and simultaneously presenting the audio content audibly and the set of route directions graphically.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Figure 1:
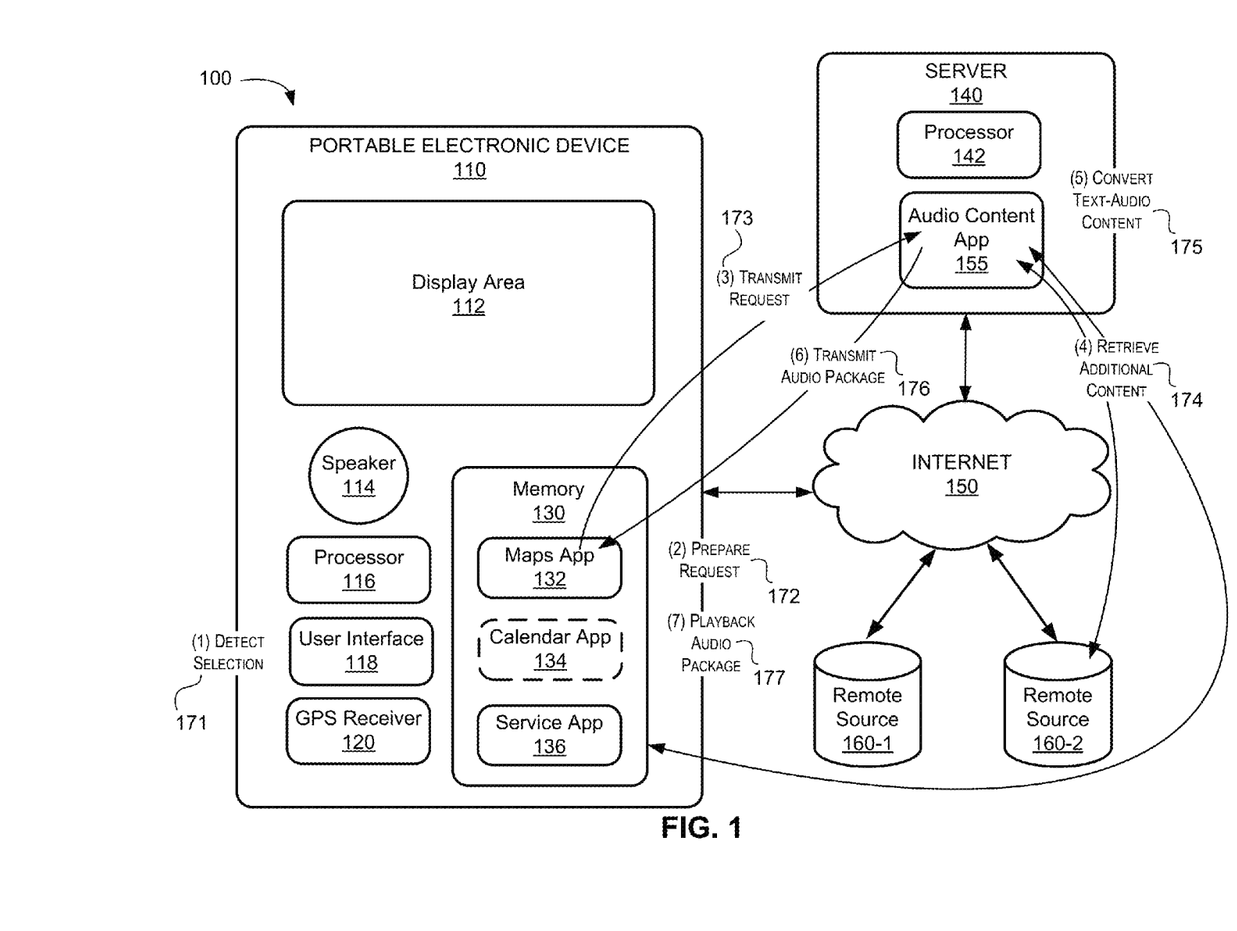
FIG. 1 illustrates a workflow for providing additional content to a portable electronic device according to one embodiment.

FIG. 1 illustrates a workflow for providing additional content to a portable electronic device according to one embodiment. A server can provide the additional content to the portable electronic device while the portable electronic device is in transit to a destination. The additional content can be information that is relevant to the destination or a place of interest located at the destination. For example if the destination is the Golden Gate Bridge in San Francisco, the additional content can be historical information on the Golden Gate Bridge. The additional content can also be information that is relevant to an upcoming appointment that is taking place at the destination. For example, the additional content can be a problem statement provided by a customer that describes an issue the customer is having with a product. The upcoming service appointment was scheduled so that a technician can resolve the issue with the product. Besides a problem statement, the additional content can also include the product purchase date, product warranty coverage, product description, customer metadata, and other information that is relevant to the upcoming appointment. While this embodiment is described in the context of a technician traveling to a destination specified in an upcoming appointment, it is to be understood by those of skill in the art that the techniques described here can also be utilized in other scenarios where a user is using a maps application to travel to a destination.

Workflow 100 includes portable electronic device 110, server 140, internet 150, and remote sources 160-1 and 160-2. Portable electronic device 110 includes display area 120, speaker 114, processor 116, user interface 118, GPS receiver 120, and memory 130. Memory 130 can store multiple applications, including maps application 132, service application 136, and optionally calendar application 134. Maps application 132 can communicate with GPS receiver 120 to provide route directions for traveling to a destination associated with an upcoming appointment while calendar application 134 can provide a list of upcoming appointments, thus allowing the user to maps out the appointments for the day, week, or other duration of time. The appointments can be service appointments to perform a task on a customer product that is located at the destination. Each service appointment can belong to a support ticket used by customer support to track issues with products sold by the company.

Server 140 includes processor 142 and audio content application 155. Audio content application 155 is configured to aggregate content from multiple sources to prepare an audio package for the technician operating portable electronic device 110. The aggregated content can come from remote source 160-1, remote source 160-2, or portable electronic device 110. In some examples, remote source 160-1 and 160-2 can store content such as a support ticket database that monitors issues customers are having with the products, a product database containing details on the products offered by the company, a service database that contains service manuals or instructions for repairing the products, and a customer database that tracks the customers of the company.

In one embodiment, audio content application 155 can prepare an audio package that is relevant to a destination or an upcoming service appointment that a user operating portable electronic device 110 is in route to. Some of the information in the audio package can be information that must be reviewed by the technician before attending the upcoming service appointment. For example, the information can include the name of the customer, the product that is having issues, and the problem statement provided by the customer. Server 140 can transmit the audio package to portable electronic device 110, which in turn plays back the audio package while the user is traveling to the destination, either via bike, car, truck, train, or other mode of transportation. This allows the user to audibly consume additional content that is relevant to the destination or upcoming appointment while in transit to the destination. This can result in a savings in the review time needed once the user reaches the destination. Moreover, the user can be better informed about a place of interest at the destination or about details on the upcoming appointment when the user reaches the destination. Portable electronic device 110, server 140, and remote sources 160-1 and 160-2 can communicate with one another through internet 150.

In one embodiment, the audio package can contain an expiration date. Once the expiration date has passed, the audio package can be automatically deleted from where it is stored, whether that be on portable electronic device 110 or server 140. Advantages of the expiration date include a reduction in the memory footprint required to store the audio packages on portable electronic device 110 (or server 140) and improved security as private information that may be included in the audio package is promptly deleted after use. In other embodiments, the audio package can be set for single-time playback. In yet other embodiments, the audio package can be streamed on the portable electronic device 110. As such, the audio package is not stored on portable electronic device 110.

In the initial state of workflow 100, processor 116 of portable electronic device 110 executes maps application 132. Maps application 132 can provide a set of route directions to a destination by determining the current location of portable electronic device 110 using GPS receiver 120 and the GPS location of the destination. The destination can be associated with an upcoming appointment that was provided by calendar application 134. While on route to the destination, portable electronic device 110 can detect that the technician has selected the option to receive additional content while the technician is in transit to the destination at step (1) (reference numeral 171).

Upon detecting the selection, portable electronic device 110 can prepare a content request at step (2) (reference numeral 172). The content request can be prepared by maps application 132, calendar application 134, or other applications stored in memory 130. Depending on implementation details, the content request can contain a variety of information. In one embodiment, the content request can include one or more instructions that specify content to be included in the audio package. For example, the content request can include an instruction to include instructions for repairing a nozzle on a specific model of a washing machine. In another embodiment, the content request can include details on the upcoming appointment. For example, the content request can include the model number of the product, the name of the product, the purchase date of the product, metadata on the customer who purchased the product, the support ticket number, the technician ID, and others. These details can be utilized by server 140 to determine what additional content to include the audio package.

In yet another embodiment, the content request can include an estimated travel time. The estimated travel time can provide an estimate for the amount of time that remains before the technician operating portable electronic device 110 reaches the destination associated with the upcoming appointment. By providing the estimated travel time, the audio package can be generated such that playback of the audio package can occur within the estimated travel time. This can increase the likelihood that the technician can hear the audio package in its entirety before reaching the destination.

Once audio content application 155 receives the content request, audio content application 155 can process the content request and retrieve additional content at step (4) (reference numeral 174). In one embodiment, a portion of the additional content can be retrieved from remote source 160-1 or 160-2. In another embodiment, audio content application 155 can retrieve a portion of the additional content from portable electronic device 110. For example if the additional content includes a problem statement that is stored as part of the upcoming appointment accessible by calendar application 134, audio content application 155 can communicate with portable electronic device 110 to retrieve the problem statement. In some embodiments, the amount of additional content that is retrieved can be based on the estimated travel time. Audio content application 155 can estimate the amount of additional content that can be presented audibly to the technician before the technician reaches the destination.

Periodically, the additional content that is available for an upcoming appointment may be insufficient to consume all of the estimated travel time. This can occur especially when the technician needs to drive a long distance to reach the upcoming service appointment. For example, the additional content available for an upcoming appointment can be insufficient to fill the duration of a forty minute travel time. In one embodiment, audio content application 155 can determine that there is insufficient additional content and query calendar application 134 for the subsequent upcoming appointment. Audio content application 155 can retrieve extra content for the subsequent upcoming appointment and incorporate the extra content into the audio package. In on example, the extra content can be appended to the content that has been previously retrieved. This can prove to be particularly useful if the estimated travel time for the subsequent upcoming appointment is short. In some examples, the extra content associated with the subsequent upcoming appointment that has been presented while driving to the upcoming appointment can be identified so that the extra content is not retrieved a second time for presentation when traveling to the subsequent upcoming appointment.

In some embodiments, some or all of the additional content can be in textual format. In these instances, audio content application 155 can convert text content to audio content at step (5) (reference numeral 175). A text to speech conversion tool can be utilized to convert the text content into audio content. After converting the text content, the audio content can be packaged together to form an audio package which is in turn transmitted to portable electronic device 110 at step (6) (reference numeral 176). Once the audio package is received portable electronic device 110 can playback the audio package at step (7) (reference numeral 177). In one embodiment, the audio package can be played back on speaker 114 while route directions are graphically presented on display area 112. This allows the technician to follow the directions to the destination while also consuming additional content played back on speaker 114.

Portable electronic device 110 can playback the audio package while portable electronic device 110 is traveling to a destination specified by maps application 132. This allows the user of portable electronic device 110 to consume the additional content while traveling to the destination, thus saving time. In one example, a technician driving to an upcoming service appointment can use portable electronic device 110 to receive graphical route directions to reach a destination associated with the upcoming service appointment. While the technician is driving, portable electronic device 110 can also audibly present additional content that is related to the upcoming service appointment. This can save the technician time since the technician does not need to spend time reviewing the additional content when he arrives at the service appointment. In one embodiment, portable electronic device 110 can adjust the playback rate of the audio package when it detects that the estimated travel time has changed by more than a predefined threshold. This can help ensure that the playback of the audio package is completed before the technician arrives at the destination. In another embodiment, the set of route directions can include a graphical representation and an audible representation. The audible representation can be played over the audio content when a turn is approaching. For example, an audible note stating "turn right in 100 feet" can be played over the audio content when the set of route directions include a right turn within the next 100 feet.

Figure 2:
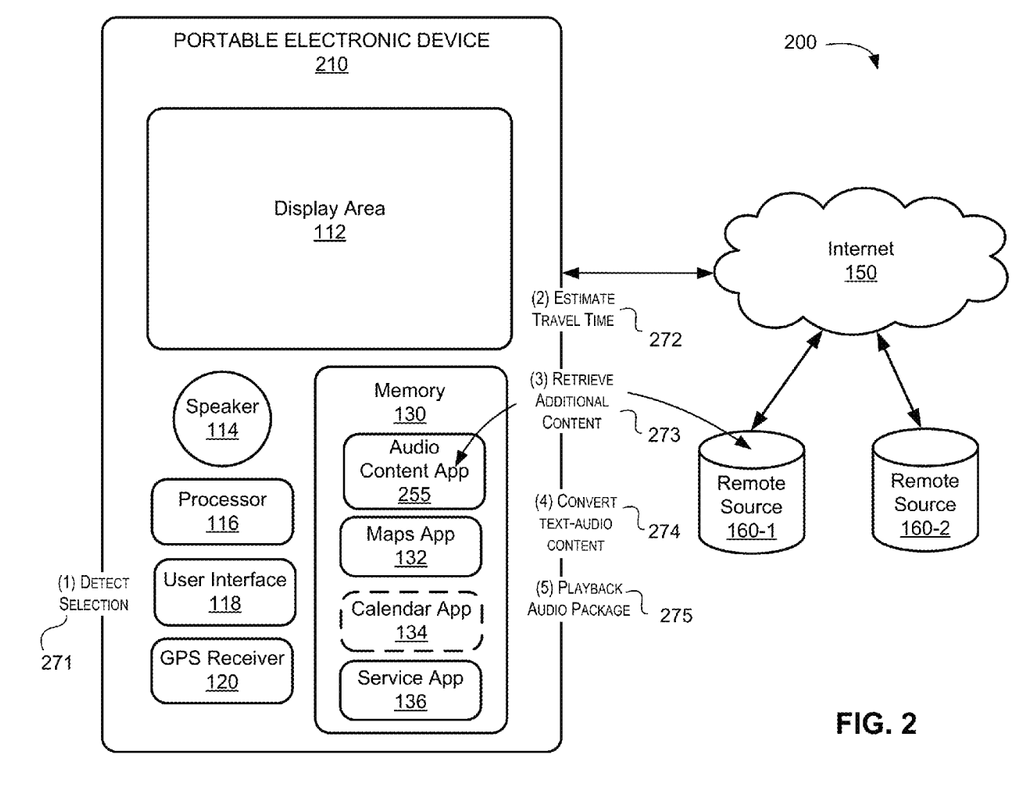
FIG. 2 illustrates another workflow for providing additional content to a portable electronic device according to one embodiment.

FIG. 2 illustrates another workflow for providing additional content to a portable electronic device according to one embodiment. Unlike workflow 100 of FIG. 1 where server 140 generates the audio package, workflow 200 illustrates a technique where portable electronic device 210 generates the audio package. Workflow 100 includes portable electronic device 210, internet 150, and remote source 160-1 and 160-2. Portable electronic device 210 is similar or substantially similar to portable electronic device 110 of FIG. 1 except that portable electronic device 210 includes audio content application 255 in memory 130. Audio content application 255 can be configured to generate an audio package. The audio package can be configured for playback on portable electronic device 210 while route directions are being provided by maps application 132.

Similar to workflow 100, processor 116 of portable electronic device 210 is executing maps application 132 during the initial state of workflow 200. Maps application 132 can provide a set of route directions to a destination by determining the current location of portable electronic device 110 using GPS receiver 120 and the GPS location of the destination. The destination can be associated with an upcoming appointment that was provided by calendar application 134. While on route to the destination, portable electronic device 110 can detect that the technician has selected the option to receive additional content while the technician is in transit to the destination at step (1) (reference numeral 171). In one embodiment, the option can be presented as an icon on the graphical user interface of maps application 132.

After detecting the selection, workflow 200 can continue by determining the estimated travel time at step (2) (reference numeral 272). Audio content application 255 can retrieve the estimated travel time from maps application 132 or alternatively can calculate the estimated travel time based on the GPS location of portable electronic device 210 (determined by GPS receiver 120) and the GPS location of the destination. Audio content application 255 can then continue by retrieving the additional content from remote source 160-1 and/or 160-2 at step (3) (reference numeral 273). In one embodiment, audio content application 255 can decide what additional content to retrieve based on the content available on portable electronic device 210. Content that is available on portable electronic device 210 should not be retrieved from remote sources. In another embodiment, audio content application 255 can decide what additional content to retrieve based on the task that the technician is performing at the upcoming appointment. Additional content such as service manuals or warranty coverage can be retrieved if the information is useful during the upcoming service appointment. In another embodiment, audio content application 255 can decide what additional content to retrieve based on the estimated travel time. In one example, additional content can be retrieved until there is sufficient content to present audibly within the estimated travel time. In another example, additional content for a subsequent upcoming appointment can be retrieved where there is insufficient content on the upcoming appointment to present audibly within the estimated travel time.

Workflow 200 can then continue with audio content application 255 convert additional content that is in text format to an audio format at step (4) (reference numeral 274). A text to speech conversion tool can be utilized to convert the text content into audio content. The audio content can be packaged together as an audio package, which can be played back at step (6) (reference numeral 176). In one embodiment, portable electronic device 210 can playback the audio package on speaker 114 while route directions are graphically presented on display area 112. This allows the technician to follow the directions to the destination while also consuming additional content played back on speaker 114.

Figure 3A:
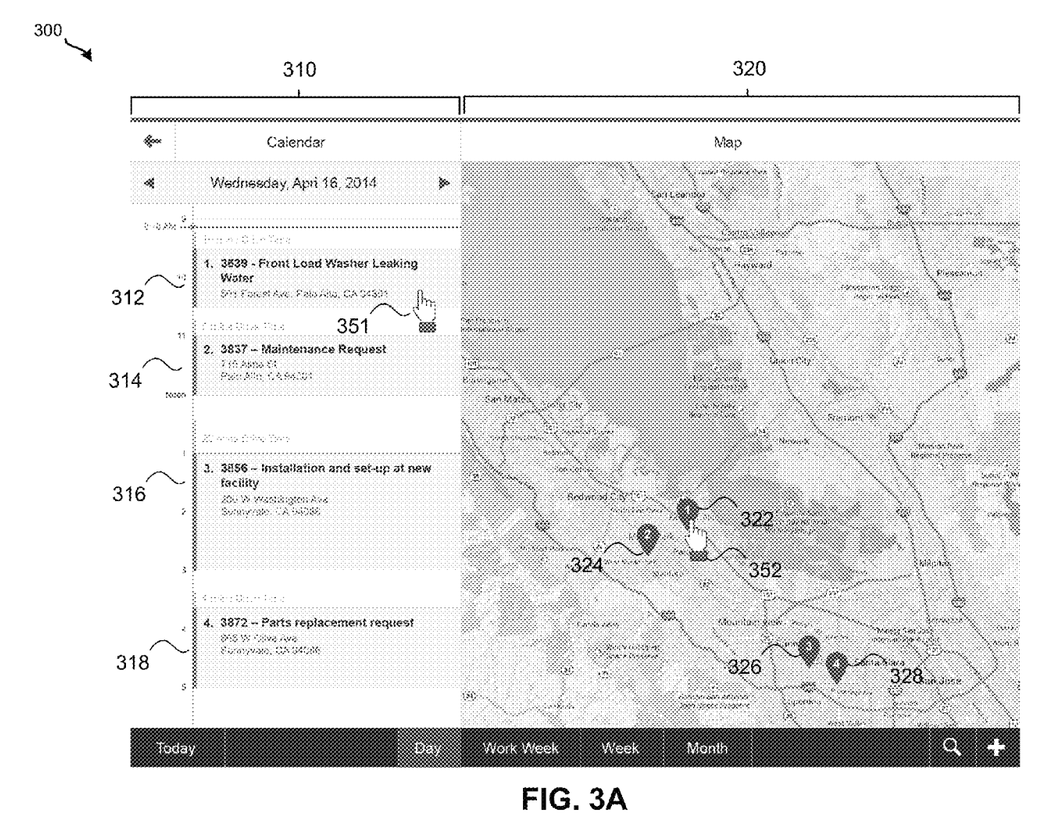
FIG. 3A illustrates a graphical user interface (GUI) belonging to a service application according to one embodiment.

FIG. 3A illustrates a graphical user interface (GUI) belonging to a service application according to one embodiment. In some embodiments, service application 136, which is configured to assist a technician in servicing active support tickets, can generate GUI 300 for presentation on display 112. GUI 300 can be a 'today' view generated by service application 136. Service application 136 can also include a 'day' view, 'work week' view, 'week' view, and 'month' view.

GUI 300 includes calendar tile 310 and map tile 320. Calendar tile 310 can be presented simultaneously with map tile 320. Calendar tile 310 can include a listing of upcoming service appointments for the day. Each appointment can be presented as an appointment icon on a vertical timeline where appointments scheduled earlier in the day appear above appointments scheduled later during the day. As shown here, the service appointments can be presented in chronological order (e.g., morning appointments followed by afternoon appointments) with appointment icon 312 appearing first followed by appointment icons 314, 316, and 318.

In one embodiment, each appointment icon can present a subject line that provides a summary for the appointment. For example, appointment icon 312 includes a subject line stating "3639—Front Load Washer Leaking Water" where "3639" is the support ticket ID and "Front Load Washer Leaking Water" is a summary of the issue. Appointment icon 312 can also include the destination address where the service appointment is to take place. Appointment icon 312 can also be accompanied with an estimated drive time that is presented above appointment icon 312. The estimated drive time is an estimation on the period of time it will take the technician to travel to the destination address from the technician's current location. Here, the estimated drive time to reach the appointment that corresponds with appointment icon 312 is 15 minutes.

Map tile 320 can present a map that includes map pins. Each appointment for the day can correspond to a map pin where the map pin is placed on the map at the destination address of the appointment. As shown here, map pin 322 and appointment icon 312 are both associated with the first appointment of the day. Similarly, map pin 324 and appointment icon 314 are both associated with the second appointment of the day, map pin 326 and appointment icon 616 are both associated with the third appointment of the day, and map pin 328 and appointment icon 318 are both associated with the fourth appointment of the day. Thus, map tile 320 can provide a summary of the overall route which the technician will be traveling during the day.

In one embodiment, each appointment icon can be actionable. Selecting an appointment icon can generate a pop up window which provides details on the appointment. Similarly, each map pin can also be actionable. Selecting a map pin can also generate a pop up window which provides details on the appointment. Thus, the technician can perform one of two actions to cause the pop up window to appear. Here, touch event 351 on appointment icon 312 or touch event 352 on map icon 322 can cause the same pop up window to appear.

Figure 3B:
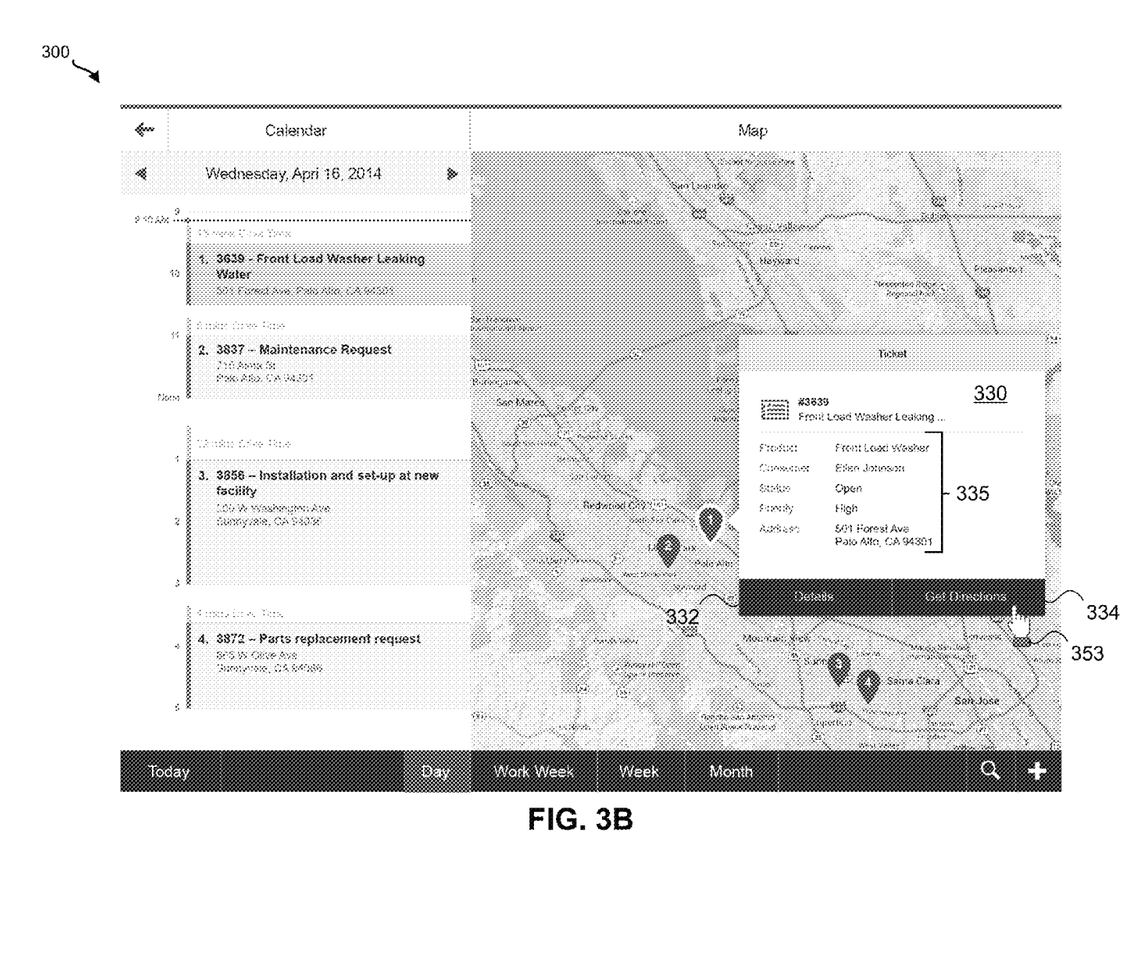
FIG. 3B illustrates a GUI belonging to a service application according to one embodiment.

FIG. 3B illustrates a GUI belonging to a service application according to one embodiment. As shown here, GUI 300 includes pop up window 330 which presents details on the appointment. Pop up window 330 can be presented in response to touch event 351 or touch event 352 of FIG. 3A. In one embodiment, pop up window 330 can present additional details that were not provided in appointment icon 312. For example, details 335 in pop up window 330 can present the name of the consumer and the priority of the support ticket that is related to the service appointment. This can provide the technician additional information that may be useful when performing the scheduled service. Pop up window 330 can include actionable icons 332 and 334. Selection of actionable icon 334 can cause the service application to present a first view that contains driving directions to the appointment. An example of the first view is described below in FIGS. 4A and 4B. Selection of actionable icon 332 can cause the service application to present a second view that contains details on the support ticket. An example of the second view is described below in FIG. 5.

Figure 4A:
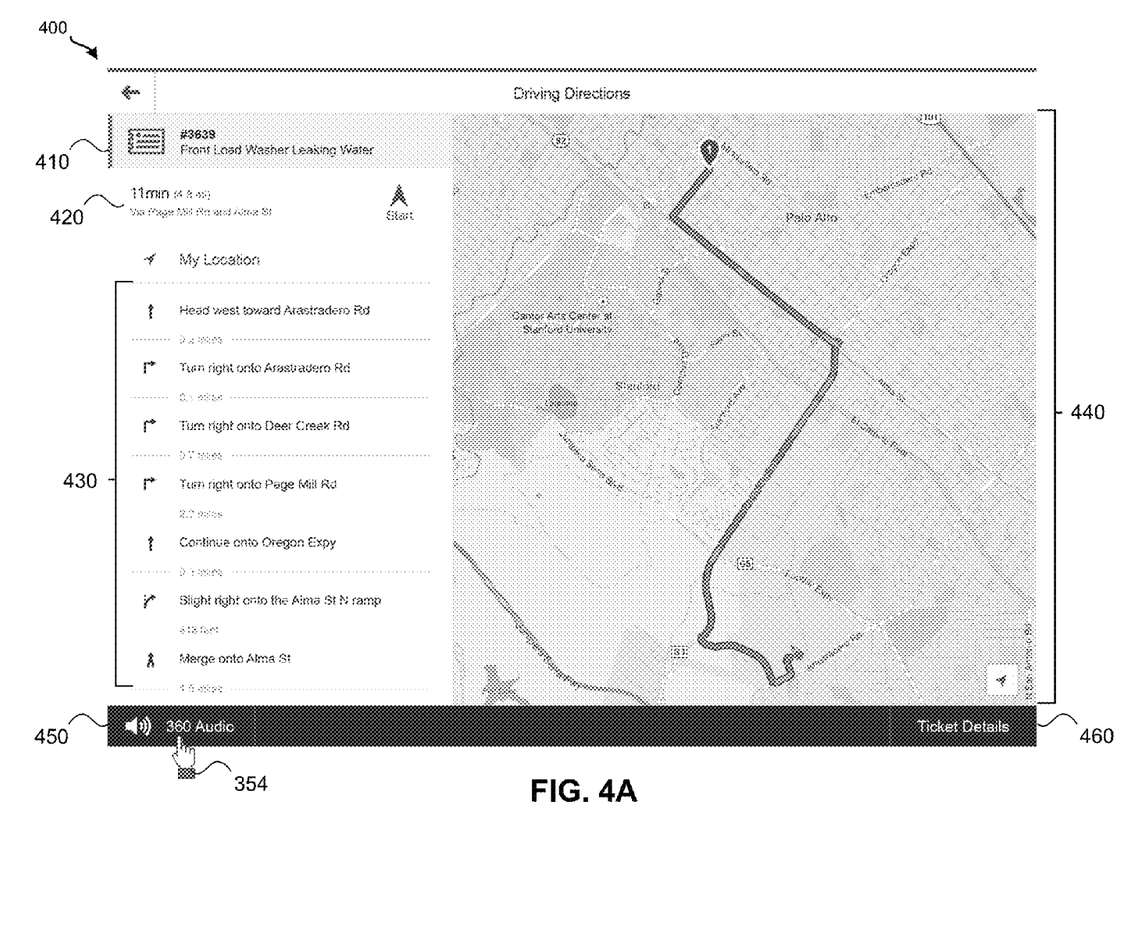
FIG. 4A illustrates a GUI belonging to a service application according to one embodiment.

FIG. 4A illustrates a GUI belonging to a service application according to one embodiment. In some embodiments, service application 136, which is configured to assist a technician in servicing active support tickets, can generate GUI 400 for presentation on display 112. GUI 400 can be a 'driving directions' view generated by service application 136 to provide the technician a set of route instructions to reach a destination address that is associated with a service appointment. GUI 400 can include summary icon 410 that provides a summary describing the purpose of the service appointment. GUI 400 can also include an estimated travel time icon 420 that provides an estimation for the duration of time that is needed to reach the destination address based on the current location of the portable electronic device. Set of route instructions 430 are also presented to provide the technician step-by-step instructions to reach the destination address. GUI 400 can further include map 440 to provide a graphical representation of the proposed route to reach the destination address.

In one embodiment, GUI 400 can further include additional content icon 450. Additional content icon 450 can be an actionable icon which when selected, can provide the technician additional content in the form of audio. The additional content can be related to the upcoming appointment which the technician is currently in route to or a future appointment. When touch event 354 is detected on additional content icon 450, the service application can retrieve the additional content as an audio package and play back the audio package to the technician through a speaker of the portable electronic device. GUI 400 can further include details icon 332. Details icon 332 can be an actionable icon that when selected, can cause the service application to present a view that contains details on the support ticket. An example of the view is described below in FIG. 5.

Figure 4B:
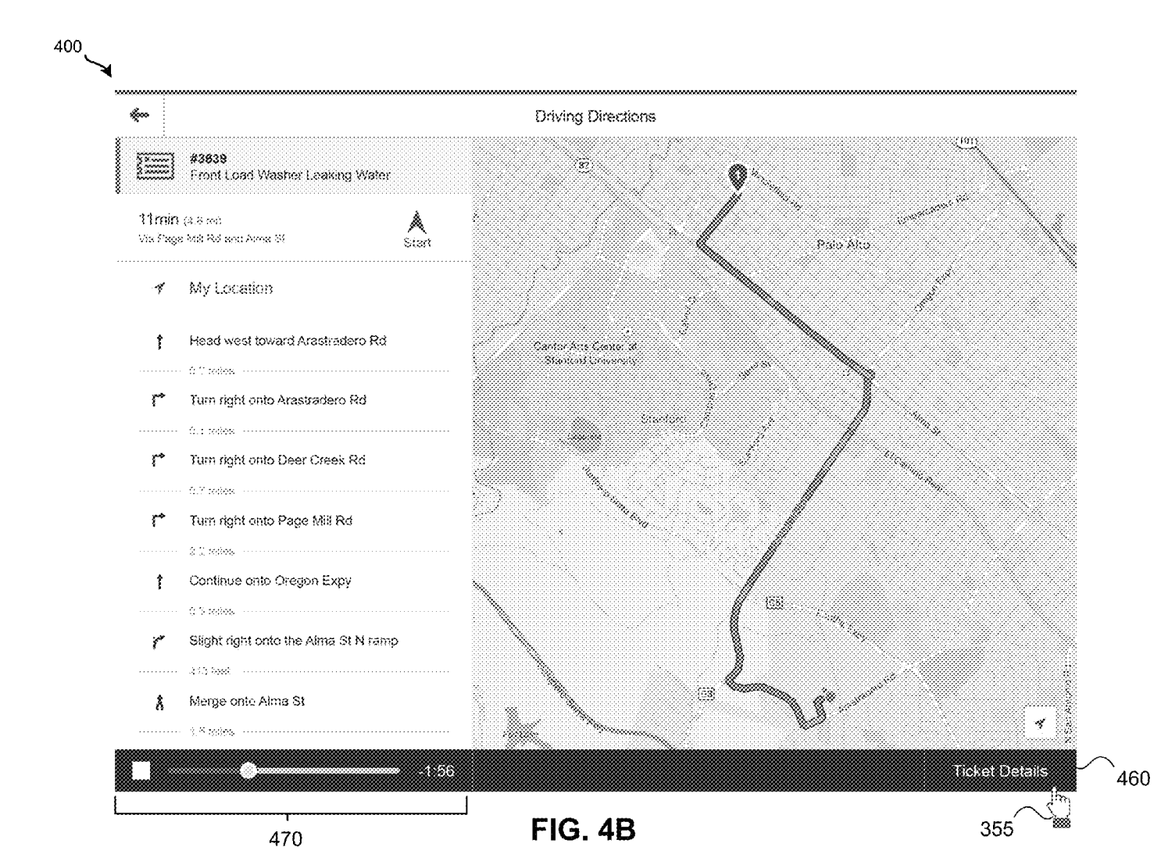
FIG. 4B illustrates a GUI belonging to a service application according to one embodiment.

FIG. 4B illustrates a GUI belonging to a service application according to one embodiment. In some embodiments, service application 136, which is configured to assist a technician in servicing active support tickets, can generate GUI 400 for presentation on display 112. GUI 400 of FIG. 4B can be presented in response to detecting touch event 354 of FIG. 4A, which is the selection of additional content icon 450 of FIG. 4A. As shown here, additional content icon 450 of FIG. 4A has been replaced with media player 470 of FIG. 4B. Media player 470 can be configured to playback the audio package that accompanies the driving directions. Like a standard player, media player 470 can include a scroll bar to seek through the audio package, a play/stop icon to start and stop playback of the audio package, and a time display to present timing information that corresponds to the playback of the audio package.

Figure 5:
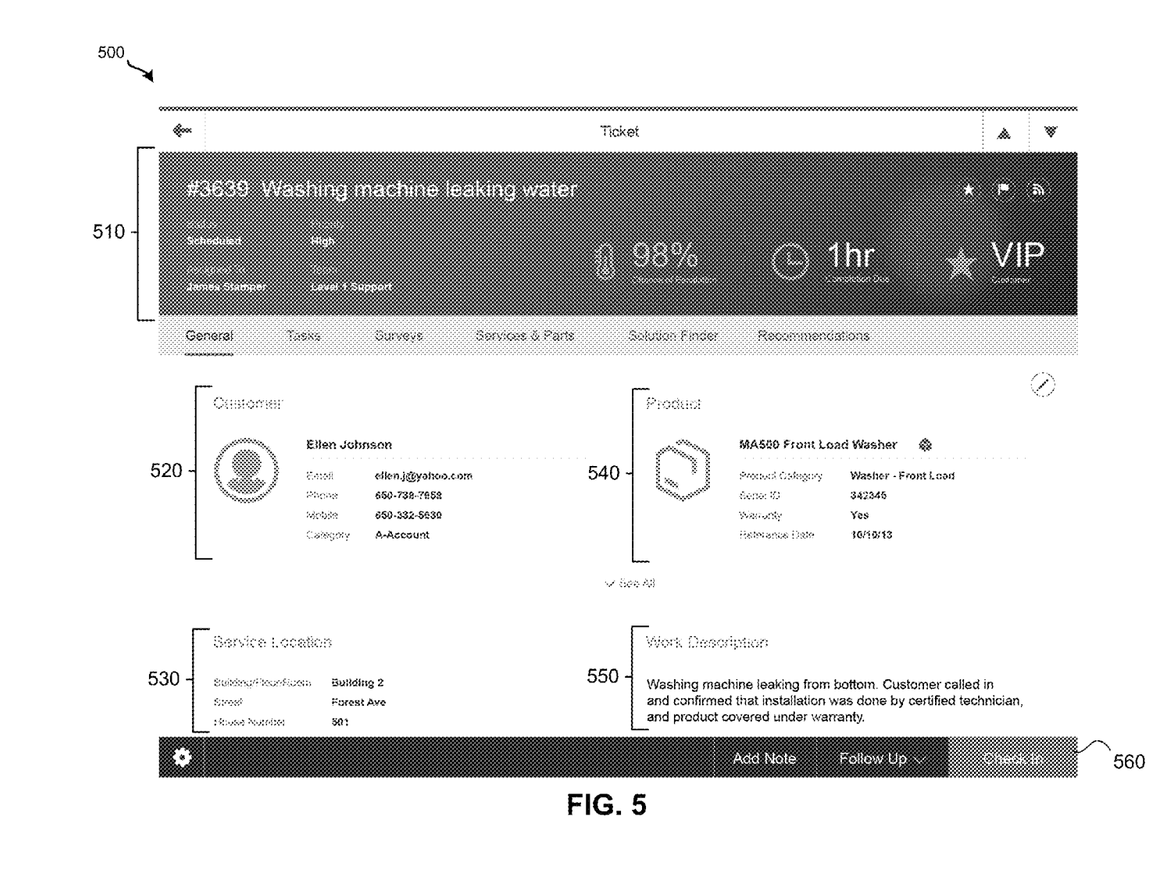
FIG. 5 illustrates a GUI belonging to a service application according to one embodiment.

FIG. 5 illustrates a GUI belonging to a service application according to one embodiment. In some embodiments, service application 136, which is configured to assist a technician in servicing active support tickets, can generate GUI 500 for presentation on display 112. GUI 500 can be a detailed ticket view configured to provide a technician details on a support ticket. GUI 500 can include header 510, customer data field 520, destination location field 530, product field 540, and work description field 550. Data presented in header 510 or the fields of GUI 500 can be stored on the portable electronic device. In one embodiment, service application 136 can generate a request for additional content based on the information stored on the portable electronic device. The additional content request can be transmitted to server 140 for processing. In another embodiment, service application 136 can retrieve additional content from remote sources based on the information stored on the portable electronic device. For example, service application 136 may skip the retrieval of information that is already stored on the portable electronic device.

Figure 6:
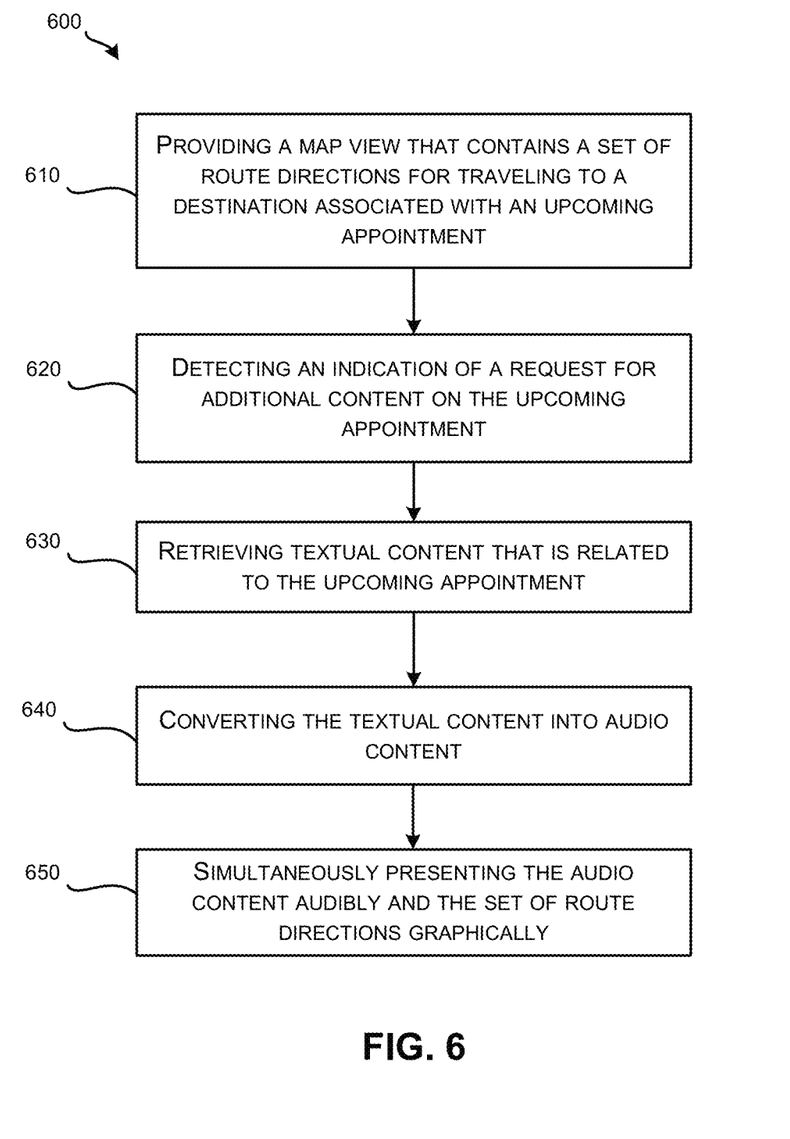
FIG. 6 illustrates a process for presenting additional content along with a set of route directions according to one embodiment.

FIG. 6 illustrates a process for presenting additional content along with a set of route directions according to one embodiment. Process 600 can be stored in computer readable code and executed by a processor. For example, process 600 can be a part of the computer readable code that audio content application 255 of FIG. 2. Process 600 begins by providing a map view that contains a set of route directions for traveling to a destination associated with an upcoming appointment at 610. The map view can be presented on a display of a portable electronic device. Process 600 then continues by detecting an indication of a request for additional content on the upcoming appointment at 620. The indication can be the triggering of a touch event on an icon presented on the display of the portable electronic device. In response to the detection, process 600 can retrieve textual content that is related to the upcoming appointment at 630. The textual content can be retrieved in accordance to the estimated travel time, the content available on the portable electronic device, and/or content having a high value that is related to the upcoming appointment. At 640, process 600 can continue by converting the textual content into audio content. Process 600 can then simultaneously present the audio content audibly and the set of route directions graphically at 650.

Figure 7:
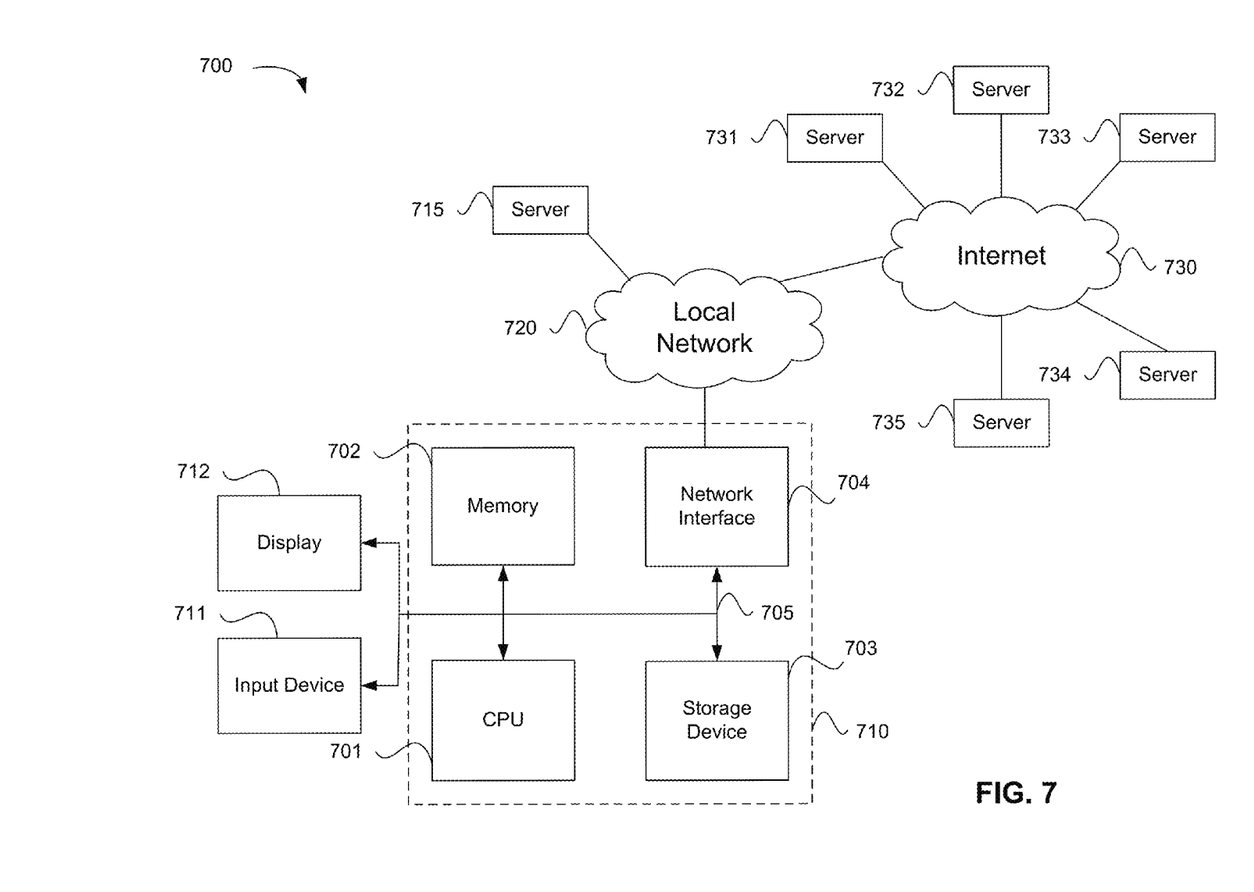
FIG. 7 illustrates an exemplary computer system according to one embodiment.

An exemplary computer system 700 is illustrated in FIG. 7. Computer system 710 includes bus 705 or other communication mechanism for communicating information, and a processor 701 coupled with bus 705 for processing information. Computer system 710 also includes a memory 702 coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device and memory are both examples of computer readable mediums.

Computer system 710 may be coupled via bus 705 to a display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. For a local network, computer system 710 may communicate with a plurality of other computer machines, such as server 715. Accordingly, computer system 710 and server computer systems represented by server 715 may form a cloud computing network, which may be programmed with processes described herein. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method, comprising:
providing, by a processor, a map view that contains a set of route directions for traveling to a destination associated with an upcoming appointment;

detecting, by the processor, an indication of a request for additional content on the upcoming appointment;

retrieving, by the processor, textual content for servicing a product at the upcoming appointment in response to the detection;

converting, by the processor, the textual content into audio content; and simultaneously presenting, by the processor, the audio content audibly and the set of route directions graphically.

2. The computer-implemented method of claim 1, wherein the upcoming appointment is a service appointment to perform a task on the product.

3. The computer-implemented method of claim 2, wherein the textual content includes instructions for performing the task on the product.

4. The computer-implemented method of claim 1, wherein retrieving the textual content comprises:

determining, by the processor, an estimated travel time to reach the destination; and retrieving, by the processor, the textual content based on the determination, wherein the textual content is a portion of the additional content that, when converted into the audio content, has a playback duration that is substantially equal to the estimated travel time to reach the destination.

5. The computer-implemented method of claim 1, further comprising:

first determining, by the processor, an estimated travel time to reach the destination;

second determining, by the processor, that the additional content available on the upcoming appointment, when converted into the audio content, has a playback duration that is less than the estimated travel time to reach the destination;

identifying, by the processor, a subsequent upcoming appointment;

retrieving, by the processor, extra content that is related to the subsequent upcoming appointment based on the second determination; and incorporating, by the processor, the extra content into the audio content.

6. The computer-implemented method of claim 1, further comprising:

detecting, by the processor, a change in an estimated travel time to reach the destination; and adjusting, by the processor, a playback speed of the audio content in accordance to the detection.

7. The computer-implemented method of claim 1, wherein the set of route instructions includes an audible representation and a graphical representation, wherein the audible representation of the set of route instructions is played over the audio content when a turn is approaching.

8. A non-transitory computer readable storage medium storing one or more programs, the one or more programs comprising instructions for:

providing a map view that contains a set of route directions for traveling to a destination associated with an upcoming appointment;

detecting an indication of a request for additional content on the upcoming appointment;

retrieving textual content for servicing a product at the upcoming appointment in response to the detection;

converting the textual content into audio content; and simultaneously presenting the audio content audibly and the set of route directions graphically.

9. The non-transitory computer readable storage medium of claim 8, wherein the upcoming appointment is a service appointment to perform a task on the product.

10. The non-transitory computer readable storage medium of claim 9, wherein the textual content includes instructions for performing the task on the product.

11. The non-transitory computer readable storage medium of claim 8, wherein retrieving the textual content comprises:

determining an estimated travel time to reach the destination; and retrieving the textual content based on the determination, wherein the textual content is a portion of the additional content that, when converted into the audio content, has a playback duration that is substantially equal to the estimated travel time to reach the destination.

12. The non-transitory computer readable storage medium of claim 8, further comprising:

first determining an estimated travel time to reach the destination;

second determining that the additional content available on the upcoming appointment, when converted into the audio content, has a playback duration that is less than the estimated travel time to reach the destination;

identifying a subsequent upcoming appointment;

retrieving extra content that is related to the subsequent upcoming appointment based on the second determination; and incorporating the extra content into the audio content.

13. The non-transitory computer readable storage medium of claim 8, further comprising:

detecting a change in an estimated travel time to reach the destination; and adjusting a playback speed of the audio content in accordance to the detection.

14. The non-transitory computer readable storage medium of claim 8, wherein the set of route instructions includes an audible representation and a graphical representation, wherein the audible representation of the set of route instructions is played over the audio content when a turn is approaching.

15. A computer implemented system, comprising:

one or more computer processors; and a non-transitory computer-readable storage medium comprising instructions, that when executed, control the one or more computer processors to be configured for:

providing a map view that contains a set of route directions for traveling to a destination associated with an upcoming appointment;

detecting an indication of a request for additional content on the upcoming appointment;

retrieving textual content for servicing a product at the upcoming appointment in response to the detection;

converting the textual content into audio content; and simultaneously presenting the audio content audibly and the set of route directions graphically.

16. The computer implemented system of claim 15, wherein the upcoming appointment is a service appointment to perform a task on the product.

17. The computer implemented system of claim 16, wherein the textual content includes instructions for performing the task on the product.

18. The computer implemented system of claim 15, wherein retrieving the textual content comprises:

determining an estimated travel time to reach the destination; and retrieving the textual content based on the determination, wherein the textual content is a portion of the additional content that, when converted into the audio content, has a playback duration that is substantially equal to the estimated travel time to reach the destination.

19. The computer implemented system of claim 15, further comprising:
   first determining an estimated travel time to reach the destination;
   second determining that the additional content available on the upcoming appointment, when converted into the audio content, has a playback duration that is less than the estimated travel time to reach the destination;
   identifying a subsequent upcoming appointment;
   retrieving extra content that is related to the subsequent upcoming appointment based on the second determination; and
   incorporating the extra content into the audio content.

20. The computer implemented system of claim 15, further comprising:
   detecting a change in an estimated travel time to reach the destination; and adjusting a playback speed of the audio content in accordance to the detection.

* * * * *